United States Patent [19]
Bennett

[11] Patent Number: 5,945,618
[45] Date of Patent: Aug. 31, 1999

[54] METHOD AND APPARATUS FOR MUSICAL TRAINING

[76] Inventor: Morgan Bennett, 1458 Lincoln Blvd. #8, Santa Monica, Calif. 90401

[21] Appl. No.: 08/920,059

[22] Filed: Aug. 26, 1997

[51] Int. Cl.⁶ .................................................. G09B 15/02
[52] U.S. Cl. ..................... 84/477 R; 84/478; 84/485 R
[58] Field of Search ................... 84/293, 314 R, 84/477 R, 478, 485 R

[56] References Cited

U.S. PATENT DOCUMENTS

| | | |
|---|---|---|
| D. 322,815 | 12/1991 | Gollon . |
| 357,168 | 2/1887 | Barnwell . |
| 1,751,048 | 3/1930 | Miessner . |
| 3,403,590 | 10/1968 | Quinton . |
| 3,974,733 | 8/1976 | Cournoyer . |
| 3,978,756 | 9/1976 | Feldman . |
| 4,566,365 | 1/1986 | Huston, Jr. . |
| 4,712,464 | 12/1987 | Nance ..................................... 84/477 R |
| 4,885,969 | 12/1989 | Chesters . |
| 5,386,757 | 2/1995 | Derrick . |

*Primary Examiner*—Jeffrey W. Donels
*Attorney, Agent, or Firm*—Mitchell, Silberberg & Knupp LLP

[57] ABSTRACT

According to the present invention comprises a plurality of diatonic note playing fret or key, each said diatonic note playing fret or key having a diatonic note playing surface and playing a corresponding diatonic note. Also included is a plurality of diatonic sheets, each said sheet comprising a note color associated with a particular diatonic note, wherein each said diatonic note playing surface has at least one diatonic sheet secured to it such that the note color comprising the sheet corresponds to the diatonic note played by the diatonic note playing fret or key.

9 Claims, 7 Drawing Sheets

METHOD AND APPARATUS FOR MUSICAL TRAINING

BACKGROUND OF THE INVENTION

1. Field of Invention

This invention relates to musical instruments. Specifically, it relates to musical instruments designed to facilitate musical training.

2. Description of Related Art

A musical instrument generally comprises a plurality of note playing means. The most common note playing means are keys (such as the keys of a piano) and strings (such as the strings of a guitar). Generally, there is a surface corresponding to the note playing means which can be viewed by the person playing the musical instrument when the note playing means is played. For example, a piano key has a top surface which is pressed in order to play the key. A guitar has a fingerboard surface below the strings.

Figure 1:
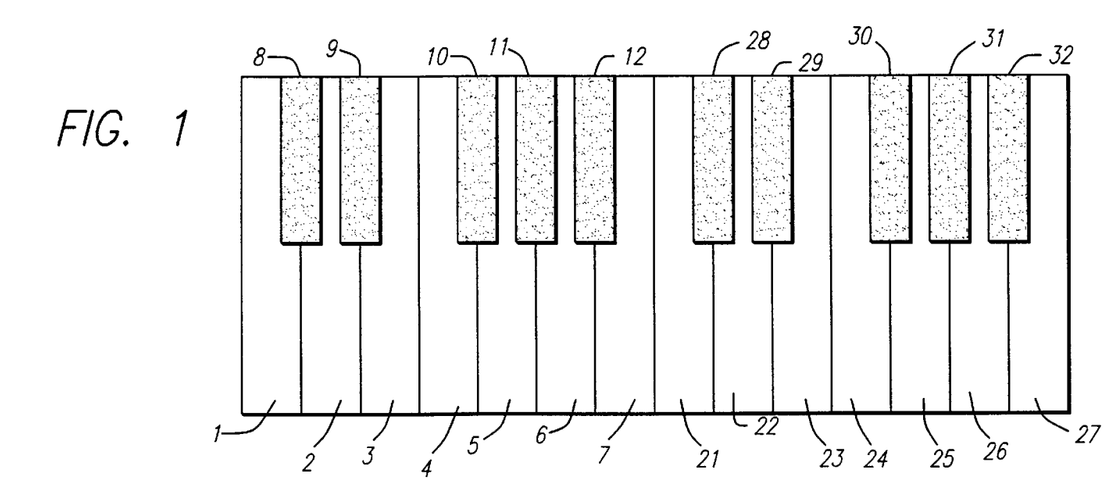
FIG. 1 shows a portion of a conventional piano keyboard.

Keyboard musical instruments come in all shapes and sizes and produce sound in many different ways. Well known keyboard instruments include pianos (electric and non-electric), organs, harpsichords, spinets, clavichords, synthesizers and accordions. Reference is made to FIG. 1, which shows part of a conventional piano keyboard. The keyboard has white keys and black keys. Each key, when pressed, produces a corresponding tone. The white keys correspond to what are commonly known as diatonic tones or notes and the black keys correspond to what are commonly known as chromatic tones or notes.

With respect to FIG. 1, the white keys include a C key 1, a D key 2, an E key 3, an F key 4, a G key 5, an A key 6 and a B key 7. The black keys include a C#/D♭ key 8, a D#/E♭ key 9, an F#/G♭ key 10, a G#/A♭ key 11, and an A#/B♭ key 12. Piano keys numbered on FIG. 1 as 1 through 12 constitute an octave.

Also shown in FIG. 1 is a second and higher octave. This second octave includes a C key 21, a D key 22, an E key 23, an F key 24, a G key 25, an A key 26 and a B key 27. The black keys included in the second octave are a C#/D♭ key 28, a D#/E♭ key 29, an F#/G♭ key 30, a G#/A♭ key 31, and an A#/B♭ key 32. C key 1, for example, is one octave lower than C key 21.

It is important to distinguish the meanings of "note" and "pitch." The C key 1 and the C key 21 play the same "note." However, the same two piano keys play tones with different "pitches" because the two keys are an octave apart.

Furthermore, "half-step" means one tone higher or lower. For example, the B key 7 is a half-step lower than the C key 21. The D#/E♭ key is one half-step higher than the D key. A "whole step" constitutes two consecutive half steps. For example, the C key 1 is one whole step lower than the D key 2, because the C#/D♭ key 8 is between said C and D keys.

Another important concept in music is that of the scale. There are many different types of scales, but the most notable are the major, minor and blues scales. The major scale is the most familiar. In playing a major scale, one would play the following notes in the following order:

1. The central note (for the C major scale, for example, the central note is "C");
2. a second note, which is the note one whole step higher than the central note (i.e., "D" for the C major scale);
3. a third note, which is one whole step higher than the second note (i.e., "E" for the C major scale);
4. a fourth note, which is one half step higher than the third note (i.e., "F" for the C major scale);
5. a fifth note, which is one whole step higher than the fourth note (i.e., "G" for the C major scale);
6. a sixth note, which is one whole step higher than the fifth note (i.e.,, "A" for the C major scale);
7. a seventh note, which is one whole step higher than the sixth note (i.e., "B" for the C major scale); and
8. the central note, which is played one half-step higher than the seventh note (i.e., "C" for the C major scale, except one octave higher than the initial C note played). Therefore, to play the C major scale, one could play the following keys from FIG. 1 in the following order: 1; 2; 3; 4; 5; 6; 7; and 21.

Using the same formula for a major scale, to play the G major scale, one would play G, A, B, C, D, E, F#, then G (one octave higher this time) again. These notes follow the same relationship of central note, whole step, whole step, half step, whole step, whole step, whole step, then half step to central note one octave higher than the first. Similarly, to play the F major scale, one would play F, G, A, B♭, C, D, E, F.

The minor scale is also important in music. In playing a minor scale, one would play the following notes in the following order:

1. The central note (for the A minor scale, for example, the central note is "A");
2. a second note, which is the note one whole step higher than the central note (i.e., "B" for the A minor scale);
3. a third note, which is one half step higher than the second note (i.e., "C" for the A minor scale);
4. a fourth note, which is one whole step higher than the third note (i.e., "D" for the A minor scale);
5. a fifth note, which is one whole step higher than the fourth note (i.e., "E" for the A minor scale);
6. a sixth note, which is one half step higher than the fifth note (i.e., "F" for the A minor scale);
7. a seventh note, which is one whole step higher than the sixth note (i.e., "G" for the A minor scale); and
8. the central note, which is played one whole step higher than the seventh note (i.e., "A" for the A minor scale, except one octave higher than the initial A note played). Therefore, to play the A minor scale, one could play the following keys from FIG. 1 in the following order: 6; 7; 21; 22; 23; 24; 25; and 26.

Using the same formula for a minor scale, to play the E minor scale, one would play E, F#, G, A, B, C, D, and E (one octave higher than the first E). These notes have the same relationship of central note, whole step, half step, whole step, whole step, half step, whole step, whole step to central note one octave higher than the first. Similarly, to play the D minor scale, one would play D, E, F, G, A, B♭, C, D.

In playing the blues scale, six notes are played, rather than eight. The pattern for the blues scale is (1) central note, (2) whole and half step (i.e., 3 half steps), (3) whole step, (4) whole step, (5) whole and half step, and (6) whole step to the central note one octave higher than the first. Therefore, for example, the A blues scale would be played A, C, D, E, G, and A. The E blues scale would be played E, G, A, B, D and E.

Figure 2:
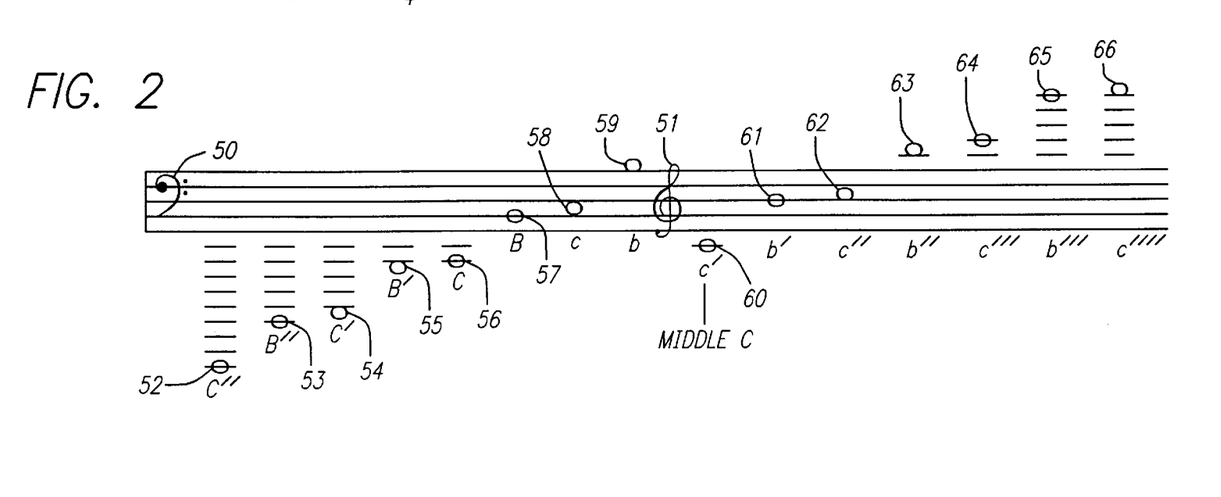
FIG. 2 shows a notation scheme for pitch.

A number of notation systems have been developed to indicate the pitches of notes. The most common is reflected by FIG. 2. This notation system uses upper and lower letters in conjunction with apostrophes to show which pitch is meant. As shown in FIG. 2, "middle C" is denoted "c'". "c" is the note "C" with a pitch one octave lower than middle C. "c''" is the note "C" with a pitch one octave higher than middle C.

In FIG. 2, the two basic clefs are reflected, the bass clef 50 and the treble clef 51. Also shown are the C and B notes from C" to c"". Table 1 below lists the pitches and their identifying number.

TABLE 1

| NUMBER | PITCH |
|---|---|
| 52 | C" |
| 53 | B" |
| 54 | C' |
| 55 | B' |
| 56 | C |
| 57 | B |
| 58 | c |
| 59 | b |
| 60 | c' |
| 61 | b' |
| 62 | c" |
| 63 | b" |
| 64 | c"' |
| 65 | b"' |
| 66 | c"" |

As mentioned above, keyboard instruments produce sounds in different ways. Many non-electric keyboard instruments further comprise strings corresponding to the keys of the keyboard, such that when a key is pressed a corresponding string is either plucked or hit to make a desired sound. Each key in a non-electric piano, for example, has a corresponding hammer which strikes a corresponding string when the key is pressed. In a harpsichord, a slender fork-shaped jack is fixed vertically to the back of the key. The jack carries in a pivoted tongue a plectrum. Depressing the key releases a cloth damper from the string, raises the jack and forces the plectrum past the string, plucking it. Numerous issued United States patents disclose and describe various ways in which to implement a keyboard instrument. Some of these U.S. patents include the following:

1. U.S. Pat. No. 3,675,527 to Reeder, Jr. issued Jul. 11, 1972, entitled Piano Construction;

2. U.S. Pat. No. 4,130,044 to Yamada et al. issued Dec. 19, 1978, entitled Keyboard Musical Instrument and Improved Piano;

3. U.S. Pat. No. 4,156,380 to Fulton issued May 29, 1979, entitled Musical Instruments;

4. U.S. Pat. No. 4,444,083 to Apel et al. issued Apr. 24, 1984, entitled Keyboard Instrument, Especially a Piano or Similar Instrument;

5. U.S. Pat. No. 4,493,237 to DeLong et al. issued Jan. 15, 1985, entitled Electronic Piano;

6. U.S. Pat. No. 5,123,321 to Caught issued Jun. 23, 1992, entitled Piano; and

7. U.S. Pat. No. 5,552,560 to Ura issued Sep. 3, 1996 entitled Electronic Keyboard Musical Instrument With Multifunctional Keyboard. Each of these seven above-listed issued U.S. patents are incorporated herein as though set forth herein in full.

For purposes of the claims herein, the term "key" is intended to broadly mean all types of keys including conventional piano keys, buttons and other actuation devices. The term "conventional piano key" means conventional piano keys generally of the shapes shown in FIG. 1. Key 1 is a "conventional C piano key." It is rectangular with a divot on the upper, right side in order to accommodate placement of the C#/D♭ key 8. Key 2 is a "conventional D piano key." It is rectangular with a first divot on the upper left side to accommodate placement of the C#/D♭ key 8 and a second divot on the upper right side to accommodate placement of the D#/E♭ key 9. Key 9 is a "conventional D#/E♭ piano key." It is rectangular, shorter than each conventional diatonic piano key, and narrower than the lower portion of each such diatonic key.

Figure 3:
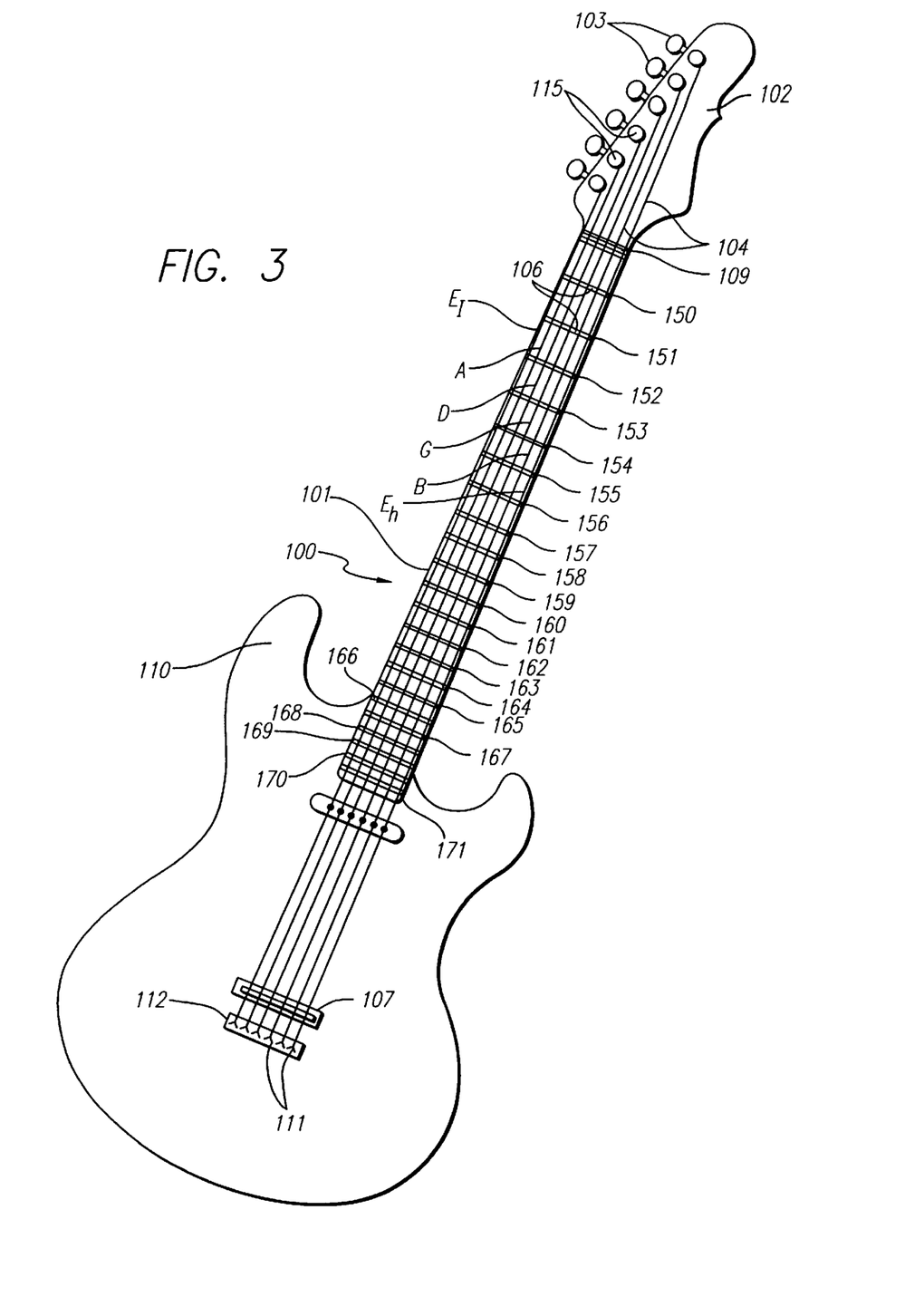
FIG. 3 shows a conventional string instrument.

FIG. 3 shows a guitar as an example of a stringed musical instrument having an elongated fingerboard. The guitar 100 comprises an elongated fingerboard 101 terminating at its upper end in a headpiece 102 which includes a number of pegs for 115 for string tensioning. The pegs are adjusted by their respective tuning keys 103 for each of the strings 104.

Fingerboard 101 has a series of frets 106, each comprising a transverse and raised rib on the upper surface of the fingerboard. The guitar in FIG. 3 includes 22 frets numbered 150 to 171 with fret number 150 located near the nut 109 at the upper end of the fingerboard at the point where the fingerboard 101 joins with the headpiece 102. Fret number 171 is located as the last fret at the lower end of the fingerboard where the fingerboard joins the tailpiece or soundboard 110 of the guitar 100.

The strings 104 extend from their respective pegs 115, over nut 109 (appropriately grooved to maintain string spacing), in parallel along the fingerboard over the spaced frets 106, to and over bridge 107 (located at the lower end of the tailpiece 110) and finally to their respective anchor points 111 on and within anchor member 112 on the tailpiece 110.

As previously noted, the strings 104, six in number, extend over substantially the entire length of the guitar from their respective anchor points 111 on and within the anchor member 112 to their respective pegs 115 and, as is conventional, the strings 104 extend slightly above the frets 106 formed on the upper surface of the fingerboard 101. For a six string guitar of the type illustrated in FIG. 1 the strings are typically tuned in the sequence $E_1$, A, D, G. B and $E_h$ from low E ($E_1$) to high E ($E_h$). In accordance with the pitch notation scheme reflected by FIG. 2, these six notes are e, a, d', g', b', and e".

A bass guitar has four strings rather than six strings. The strings on the bass guitar are set at E, A, d and g. Otherwise, the construction of a bass guitar is the same as is shown in FIG. 3.

Note variations for each string are achieved by depressing (stopped) a string at a selected fret. The note is produced by vibrating the string between the stopping fret and the bridge. Depression of each string to a stopping fret is accomplished by finger pressure applied to the string behind the fret (far side of the fret with respect to the bridge).

Not all string instruments have fretted fingerboards. For example, members of the viol family generally do not have fretted fingerboards, but in their basic construction they resemble guitars. Instruments within the viol family include, for example, the cello and the violin. Note variations are obtained with these instruments by pressing a string down to the fingerboard and then plucking or playing the string with a bow.

Numerous issued United States patents disclose and describe various ways in which to implement a string instrument. Some of these U.S. patents include the following:

1. U.S. Pat. No. 4,031,801 to Cecchini issued Jun. 28, 1997, entitled Stringed Musical Instrument;

2. U.S. Pat. No. 4,038,897 to Murray et al. issued Aug. 2, 1997, entitled Electronic Music System and Stringed Instrument Input Device Therefor;

3. U.S. Pat. No. 4,056,034 to Kaman issued Nov. 1, 1977, entitled Guitar Construction;

4. U.S. Pat. No. 4,069,732 to Moskowitz et al. issued Jan. 24, 1978, entitled Electric Guitar;

5. U.S. Pat. No. 4,372,187 to Berg issued Feb. 8, 1983, entitled Novel Guitar-Like Electronic Musical Instrument;

6. U.S. Pat. No. 4,377,101 to Santucci issued Mar. 22, 1983, entitled Combination Guitar and Bass;

7. U.S. Pat. No. 4,483,233 to Benson issued Nov. 20, 1984, entitled Combined Guitar and Bass Guitar Having Eight Strings;

8. U.S. Pat. No. 4,539,887 to Bjerkas issued Sep. 10, 1985, entitled String Instrument of Guitar Type;

9. U.S. Pat. No. 4,602,547 to Nyack, Jr et al. issued Jul. 29, 1986, entitled Electric Guitar;

10. U.S. Pat. No. 4,658,690 to Aitken et al. issued Apr. 21, 1987, entitled Electronic Musical Instrument;

11. U.S. Pat. No. 4,704,935 to Franklin issued Nov. 10, 1987, Stringed Musical Instrument;

12. U.S. Pat. No. 4,722,260 to Pigozzi issued Feb. 2, 1988, entitled Stringed Musical Instrument Having Retracting Frets;

13. U.S. Pat. No. 4,748,887 to Marshall issued Jun. 7, 1988, entitled Electric Musical String Instruments and Frets Therefor;

14. U.S. Pat. No. 4,858,509 to Marshall issued Aug. 22, 1989, entitled Electric Musical String Instruments;

15. U.S. Pat. No. 4,887,506 to Freed issued Dec. 19, 1989, entitled Stringed Musical Instrument With Magnetic Pickups;

16. U.S. Pat. No. 5,095,795 to Wilfer issued Mar. 17, 1992, entitled String Instrument, Particularly Bass Guitar Or Electronic Guitar;

17. U.S. Pat. No. 5,113,737 to Gregory issued May 19, 1992, entitled Seven String Electric Guitar;

18. U.S. Pat. No. 5,121,668 to Segan et al. issued Jun. 16, 1992, Electronic Guitar;

19. U.S. Pat. No. 5,125,312 to Fishman et al. issued Jun. 30, 1992, entitled Stringed Musical Instrument;

20. U.S. Pat. No. 5,189,235 to Fishman et al. issued Feb. 23, 1993, entitled Stringed Musical Instrument; and 21. U.S. Pat. No. 5,497,688 to Ruiz-Carrero issued Mar. 12, 1996, entitled Musical Instrument. Each of these 21 issued patents are incorporated herein as though set forth herein in full.

One element in common with respect to all of the instruments discussed above is that each note playing means (such as keys and strings) have an associated playing surface visible to the musician playing the particular instrument. The top of a piano key, for example, is an associated playing surface with is visible to the piano player. Likewise, the fingerboard directly below a string of a guitar where the string is to be depressed in order to play a certain note is a playing surface visible to the guitar player.

One problem with the string and keyboard instruments discussed above is that they are difficult to learn, especially for children. One must learn musical notation and learn the location of each note on the particular instrument to be played. The present invention provides a means to enhance and simplify learning a new musical instrument. As is discussed more fully below, the present invention utilizes color on the note playing surfaces of musical instruments in order to fulfil this purpose.

SUMMARY OF INVENTION

Therefore, an object of the present invention is to provide for a method and apparatus to facilitate the learning of musical instruments. The present invention utilizes colors in order to enhance and facilitate learning.

Accordingly, the present invention comprises a plurality of diatonic note playing means, each said diatonic note playing means having a diatonic note playing surface and playing a corresponding diatonic note. Also included is a plurality of diatonic sheets, each said sheet comprising a note color associated with a particular diatonic note, wherein each said diatonic note playing surface has at least one diatonic sheet secured to it such that the note color comprising the sheet corresponds to the diatonic note played by the diatonic note playing means.

Further, the present invention can further comprise a plurality of chromatic note playing means, each said chromatic note playing means having a playing surface and playing a corresponding chromatic note. Also included is a plurality of chromatic sheets, each said sheet comprising two colors, the combination of said colors being associated with a particular chromatic note, wherein each said chromatic note playing surface has at least one chromatic sheet secured to it such that the colors comprising the sheet are the same as those which are associated with the chromatic note corresponding to the chromatic note playing surface.

DETAILED DESCRIPTION OF THE PREFERRED EMBODIMENTS

The basic concept of the present invention is the use of color to facilitate the learning of musical instruments. According to the present invention, each diatonic note is assigned a different note color. In the preferred embodiment, the scheme is as shown in Table 2 below.

TABLE 2

| NOTE | COLOR |
|------|-------|
| A | RED |
| B | ORANGE |
| C | YELLOW |
| D | GREEN |
| E | BLUE |
| F | INDIGO |
| G | VIOLET |

As may be observed, the above color scheme is based on the colors of the rainbow. However, a scheme with different note colors assigned to the various diatonic tones can be implemented.

Chromatic notes are then each assigned two colors, specifically the two colors assigned to the two diatonic tones one half step higher and one half step lower than the particular chromatic tone. For example, the note A#/B♭ is assigned red and orange because red is assigned to A and orange is assigned to B. Of course, if other colors are assigned to A and B, those colors will be assigned to A#/B♭. Table 3 below shows the preferred color scheme for the chromatic notes.

TABLE 3

| NOTE | COLORS |
|------|--------|
| A#/B♭ | RED and ORANGE |
| C#/D♭ | YELLOW and GREEN |
| D#/E♭ | GREEN and BLUE |
| F#/G♭ | INDIGO and VIOLET |
| G#/A♭ | VIOLET and RED |

According to the present invention, the assigned colors are then used on musical instruments to facilitate learning. Therefore, for example, for a keyboard instrument, the surface of a particular diatonic key comprises the note color assigned to the note played by said key. For example, the surface of the C key comprises yellow and the surface of the F key comprises indigo. Further, the surface of each chromatic key comprises the two assigned colors of the specific note played by the key. With respect to FIG. 1, Table 4 below identifies the preferred surface colors with respect to the surfaces of the keys.

TABLE 4

| KEY | NOTE | COLOR(S) |
|-----|------|----------|
| 1 | C | YELLOW |
| 8 | C#/D♭ | YELLOW and GREEN |
| 2 | D | GREEN |
| 9 | D#/E♭ | GREEN and BLUE |
| 3 | E | BLUE |
| 4 | F | INDIGO |
| 10 | F#/G♭ | INDIGO and VIOLET |
| 5 | G | VIOLET |
| 11 | G#/A♭ | VIOLET and RED |
| 6 | A | RED |
| 12 | A#/B♭ | RED and ORANGE |
| 7 | B | ORANGE |

Keys 21 through 32 of FIG. 1, in the preferred embodiment would also be colored appropriately. For example, the C key 21 would be colored yellow just like C key 1, and so on.

It would be possible not to color every key in a keyboard and still be within the scope of the present invention. However, in the preferred embodiment, all the keys would be colored. In instances where not all of the keys are colored, it would generally be expected—although not necessary—that at least eight consecutive diatonic keys would be colored (e.g., consecutive C, D, E, F, G, A, B and C keys).

Figure 4:
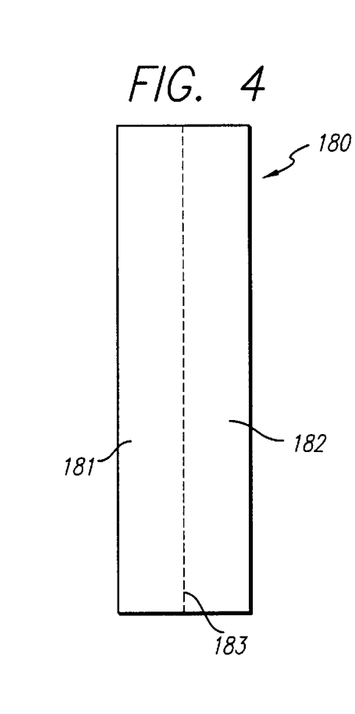
FIG. 4 shows a chromatic key in accordance with the present invention.

With respect to each chromatic key, any pattern utilizing the two assigned note colors can be used. FIG. 4, however, reflects the preferred embodiment. Shown on FIG. 4 is the top surface of a chromatic piano key 180 comprising two note colors. The chromatic key is divided into a left portion 181 and a right portion 182 by an imaginary dashed line 183. In the preferred embodiment, the left portion comprises the color assigned to the diatonic note one half step higher than the chromatic note and the right portion comprises the color assigned to the diatonic note one half step lower than the chromatic note. For example, if the chromatic key 180 is a G#/A♭ key, then the left portion 181 will comprise red (the color of the A key, which is to the right of the chromatic key 180) and the right portion 182 will comprise violet (the color of the G key, which is to the left of the chromatic key 180).

It should also be noted that it is possible not to utilize colors with respect to the chromatic keys, but leave them black or some other color not utilized with respect to the diatonic keys.

Figure 5:
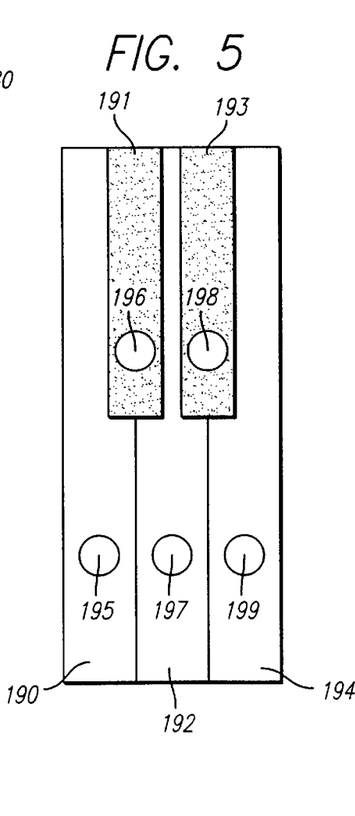
FIG. 5 shows five keys from a conventional keyboard instrument.

Also, it is not necessary to cover the entire surface of a key with its assigned color or colors. For example, one or more color dots can be used. FIG. 5 shows this dot configuration. In FIG. 5, the C key 190, C#/D♭ key 191, D key 192, D#/E♭ key 193, and E key 194 are shown. Each key has a corresponding color dot 195–199. Color dot 195 (on the C key) is colored yellow, color dot 196 (on the C#/ID♭ key) is colored yellow and green, color dot 197 (on the D key) is colored green, color dot 198 (on the D#/E♭ key) is colored green and blue and color dot 199 (on the E key) is colored blue. Dots of other colors or color combinations can be used for the other keys of the keyboard.

For purposes of this application, except were otherwise indicated, in configurations wherein the standard underlying key color still appears (the configuration shown in FIG. 5 is one such configuration) the underlying key color is termed the "base color." Therefore, with respect to a conventional piano, the base color for the diatonic keys is white and the base color for the chromatic keys is black. Generally, the diatonic keys would all have one base color (usually white) and the chromatic keys would also all have one base color (usually black).

For purposes of this application, except where otherwise indicated, the term the "note color" means the color used to designate a diatonic note. Therefore, with respect to Table 2, above, the color yellow would be the "C note color" and the color red would be the "A note color."

With respect to FIG. 5, the surface of the keys shown each comprises primarily its base color. In other words, the surface of the key is either mostly white or black in color. Accordingly, it is not necessary in order to come within the scope of the present invention to have the note color comprise a majority of the surface of a key. However, it is expected that the note color will comprise more surface area of a diatonic key than other colors (not including the base color).

However, it is expected that the note colors will not be used inconsistently within the same keyboard. For example, it would not be expected that one note color would be utilized for both a C key and an E key (or some other diatonic key other than C). Also, it would not be expected that two keys corresponding to the same note would have different note colors applied. For example, it would not be expected to have two C keys, each comprising a different note color.

Color can be supplied to the surface of each key of the keyboard in many different ways. For example, the color can be painted on. Or color stickers can be applied to the keys. Such stickers will generally be flat sheets with a top colored side and a bottom side having adhesive thereon. Appropriately colored paper can also be taped on the keys. The color dots of FIG. 5, therefore, can comprise paint, color stickers, color paper taped on to the keys, or any other means of applying color to the keys.

For purposes of the invention, it is not necessary that all keys of a keyboard be colored consistent with their respective notes. For example, on a conventional piano with black chromatic keys and white diatonic keys, one may color only the surface of the keys forming a scale. For example, one might color only the eight keys comprising a major scale (e.g., C, D, E, F, G, A, G, C (one octave higher than the first C key)). In such a case, the two central note keys would be colored the same note color.

Figure 6A:
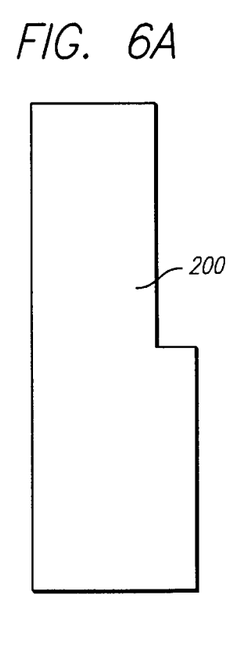
FIG. 6A shows such a color sheet for the C key.
Figure 6B:
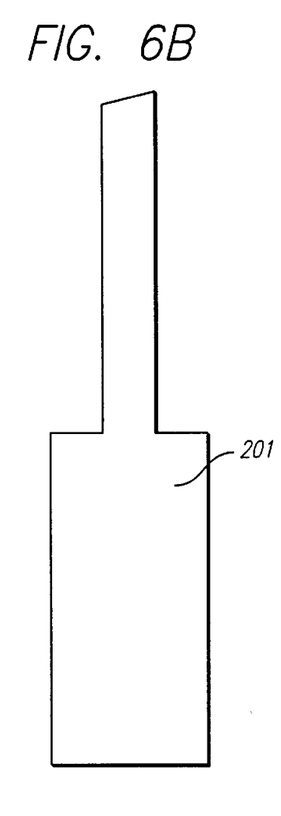
FIG. 6B shows such a color sheet for the D key.
Figure 6C:
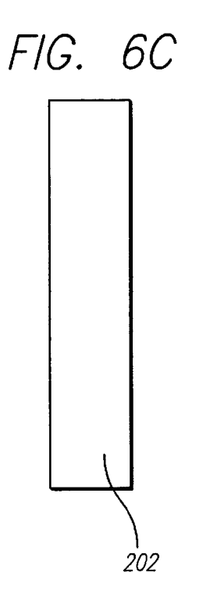
FIG. 6C shows such a color sheet for the G#/A♭ key.

In another configuration, the color comprising the surface of a particular key can cover the entire surface of the key. Therefore, a color sheet (sticker or otherwise) which substantially conforms to the outline of the surface of the key can be applied. FIG. 6A shows such a color sheet 200 for the C key, FIG. 6B shows such a color sheet 201 for the D key, and FIG. 6C shows such a color sheet 202 for the G#/A♭ key. Any sheet configuration will work so long as the dimensions of the sheet are the same or less than the dimensions of the key surface.

For purposes of this application, including the claims which follow, unless otherwise indicated, the term "surface" of a key is intended to include the color of the key, whether the color is supplied by paint, paper, plastic, or otherwise.

Figure 7:
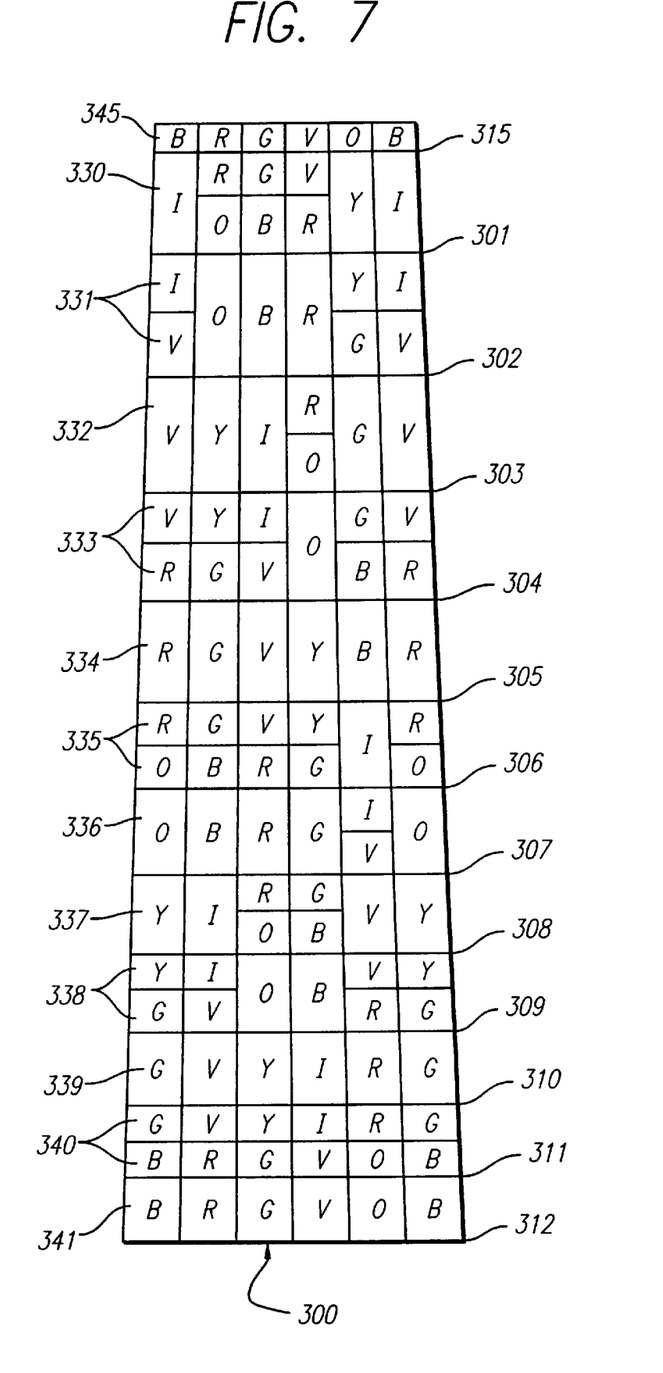
FIG. 7 shows a fretted fingerboard according to the present invention.

The present invention also has application to string instruments. FIG. 7 shows a fretted fingerboard 300 according to the present invention. The fingerboard comprises 12 frets 301 to 312. Also shown in a nut 315. Each section formed be two neighboring frets comprises six note playing surfaces corresponding to the six strings of a treble guitar. Each note playing surface comprises the note color or colors associated with the particular note played at said note playing surface. The note colors are depicted in accordance with Table 6 below. The color or colors of the particular note playing surfaces of the low E string (330 to 341) are set forth in Table 5 below.

TABLE 5

| SECTION | COLOR(S) | NOTE | FRET |
|---------|----------|------|------|
| 330 | INDIGO | F | 1st |
| 331 | INDIGO and VIOLET | F♯/G♭ | 2nd |
| 332 | VIOLET | G | 3rd |
| 333 | VIOLET and RED | G♯/A♭ | 4th |
| 334 | RED | A | 5th |
| 335 | RED and ORANGE | A♯/B♭ | 6th |
| 336 | ORANGE | B | 7th |
| 337 | YELLOW | C | 8th |
| 338 | YELLOW and GREEN | C♯/D♭ | 9th |
| 339 | GREEN | D | 10th |
| 340 | GREEN and BLUE | D♯/E♭ | 11th |
| 341 | BLUE | E | 12th |

In the preferred embodiment, the area above the nut is also colored appropriately to show the note played by an open string (i.e., a string which is not depressed to play a higher note). One colored portion 345 of said area is colored blue for the note E. The others are red for A, green for D, violet for G, orange for B and blue for E.

It would be possible not to color every note playing surface on a fingerboard and still be within the scope of the present invention. However, in the preferred embodiment, all the note playing surfaces would be colored. In instances where not all of the note playing surfaces are colored, it would generally be expected—although not necessary—that at least eight consecutive diatonic keys would be colored (e.g., consecutive C, D, E, F, G, A, B and C keys).

It should also be noted that it is possible not to utilize colors with respect to the chromatic note playing surfaces, but leave them their base color. Also, it is not necessary to cover the entire surface of a note playing surface with its assigned color or colors. For example, as with respect to piano keys, one or more color dots can be used.

It is not necessary in order to come within the scope of the present invention to have the note color comprise a majority of a note playing surface. However, it is expected that the note color will comprise more surface area of a diatonic note playing surface than other colors (not including the base color).

It is expected that the note colors will not be used inconsistently within the same fingerboard. For example, it would not be expected that one note color would be utilized for both a C note playing surface and an E note playing surface (or some other diatonic note playing surface other than C). Also, it would not be expected that two note playing surfaces corresponding to the same note would have different note colors applied. For example, it would not be expected to have two C note playing surfaces each comprising a different note color.

Color can be supplied to the surface of each note playing surface of the fingerboard in many different ways. For example, the color can be painted on. Or color stickers can be applied to the note playing surfaces. Such stickers will generally be flat sheets with a top colored side and a bottom side having adhesive thereon. Appropriately colored paper can also be taped on the note playing surfaces.

Each color sticker would preferably cover its respective note playing surface entirely. Therefore, for example, there would be six equally-sized rectangular stickers to be placed side-by-side between two neighboring frets.

In addition, with respect to a fretted string instrument, the space between frets becomes narrower the closer to the bridge. Therefore, with respect to fingerboard depicted in FIG. 7, the section between frets 301 and 302 would be wider than the section between frets 302 and 303, and so on. Therefore, the six rectangular stickers for the section between frets 301 and 302 would be longer than the stickers for the section between frets 302 and 303, which in turn would be longer than the stickers for the section between frets 303 and 304.

For purposes of this application, including the claims which follow, unless otherwise indicated, the term "surface" of a note playing surface is intended to include the color of the note playing surface, whether the color is supplied by paint, paper, plastic, or otherwise.

Figure 8:
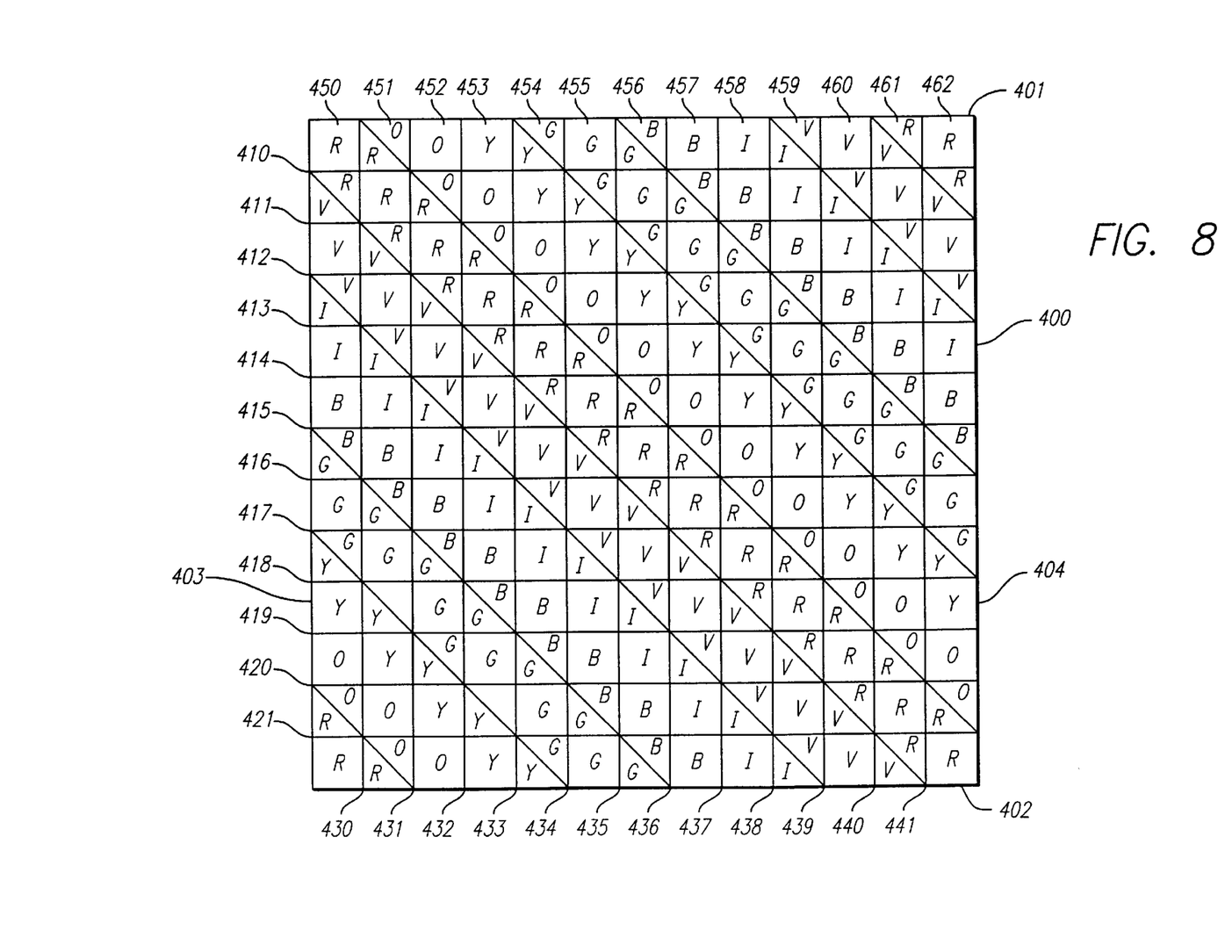
FIG. 8 shows a sheet divided into a plurality of square sections.

Use of the method of applying color to keys and fingerboards leads to other devices and methods useful in learning to play musical instruments. For example, the color scheme can be used to learn scales. FIG. 8 shows a sheet 400 divided into a plurality of square sections. The sheet is square having a top side 401, a bottom side 402, a left side 403, and a right side 404. The sheet is divided into the sections by 12 horizontal lines 410–421 and 12 vertical lines 430–441. Each section represents a note and either comprises one color or two. Table 6 below identifies each color used in FIG. 8 and the specific symbol used to identify such color.

TABLE 6

| | COLOR |
|---|---|
| R | RED |
| O | ORANGE |
| Y | YELLOW |
| G | GREEN |
| B | BLUE |
| I | INDIGO |
| V | VIOLET |

Sections 450 to 462 exemplify the sections. Sections 450, 452, 453, 455, 457, 458, 460, and 462 represent diatonic notes and each comprises the color representing its corresponding note. Sections 451, 454, 456, 459, and 461 represent chromatic tones and each comprises the two colors which combine to represent the section's corresponding note. Table 7 sets forth each of the sections 450 to 462, the color or colors comprising each section and the note represented by each section.

TABLE 7

| NUMBER | COLOR(S) | NOTE |
|---|---|---|
| 450 | RED | A |
| 451 | RED and ORANGE | A♯/B♭ |
| 452 | ORANGE | B |
| 453 | YELLOW | C |
| 454 | YELLOW and GREEN | C♯/D♭ |
| 455 | GREEN | D |
| 456 | GREEN and BLUE | D♯/E♭ |
| 457 | BLUE | E |
| 458 | INDIGO | F |
| 459 | INDIGO and VIOLET | F♯/G♭ |
| 460 | VIOLET | G |
| 461 | VIOLET and RED | G♯/A♭ |
| 462 | RED | A |

It should be observed that additional written matter besides color can also be set forth in each of the various sections of Exhibit 8. For example, the letter symbols of the notes can also be written the sections (e.g., "A" in section 450, "B" in section 452, and C#/D ♭ in section 454).

Figure 9A:
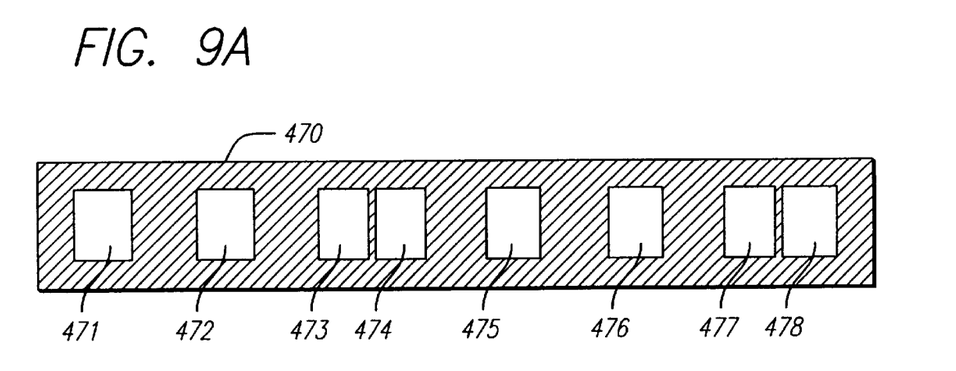
FIG. 9A shows a template corresponding to the major scale.

FIG. 9A shows a template 470 corresponding to the major scale. The template comprises a rigid sheet having a series of square holes 471–478 formed within the sheet. Each said square hole represents a note in the major scale and is substantially the size of the square sections of FIG. 8. Square holes 471–478 represent the central note, second note, third note, fourth note, fifth note, sixth note, seventh note and higher central note of the major scale respectively.

Said template can be placed over the sheet depicted in FIG. 8 so as to determine the specific notes in a specific major scale. For example, said template can be placed on the sheet 400 of FIG. 8 such that hole 471 is over section 450, hole 472 is over section 452, hole 473 is over section 454, hole 474 is over section 455, hole 475 is over section 457, hole 476 is over section 458, hole 477 is over section 461 and hole 478 is over section 462. Such placement reflects that to play the A major scale, one would play A, B, C#/D ♭, D, E, F#/G ♭, G#/A♭ and A notes. In this same manner, the template could be used in any of the rows or columns formed by the sections of sheet 400. It could be used in any row of sheet 400 reading from left to right. It could also be used in any column of sheet 400 reading from bottom to top.

Figure 9B:
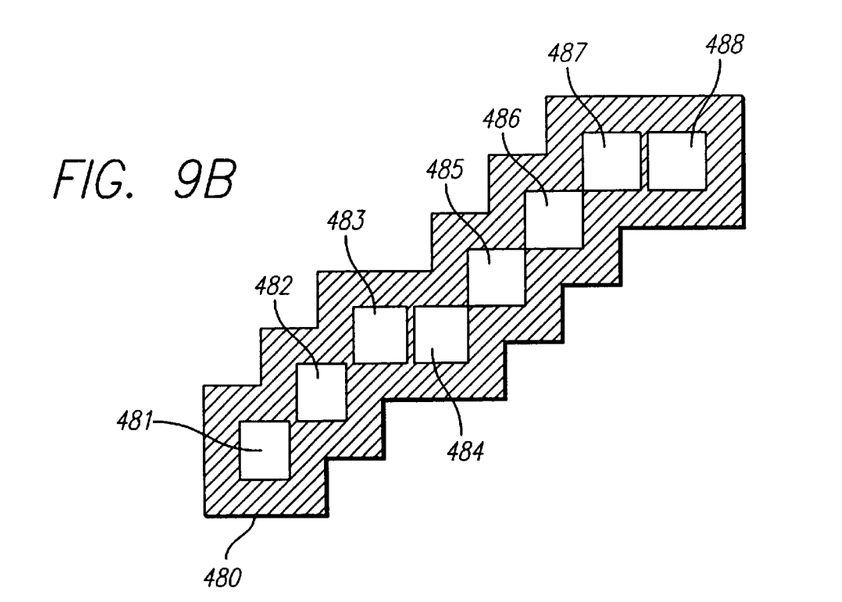
FIG. 9B shows another major scale template having holes therein.

Other template configurations can be used in conjunction with sheet 400. FIG. 9B shows another major scale template 480 having holes therein 481–488, which correspond to the central, second, third, fourth, fifth, sixth, seventh and high central notes of the major scale respectively. This same template can be utilized in conjunction with sheet 400.

Figure 9C:
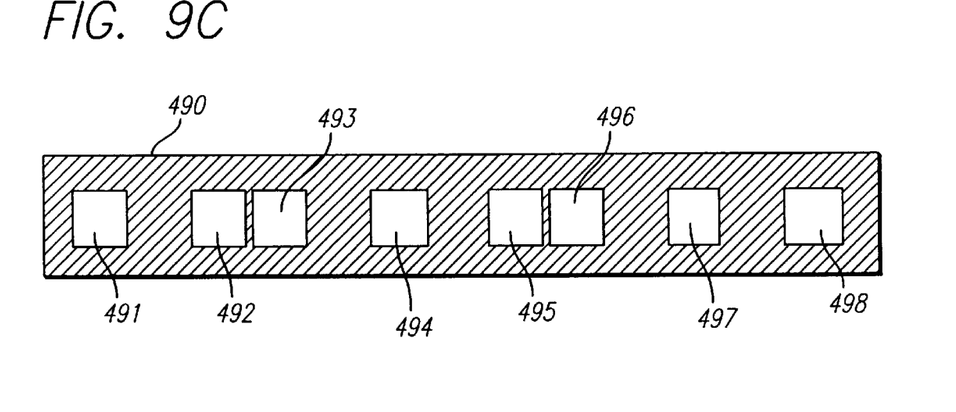
FIG. 9C shows a minor scale template having holes therein.

Similarly, FIG. 9C shows a minor scale template 490 having holes therein 491–498, which correspond to the central, second, third, fourth, fifth, sixth, seventh, and high central notes of the minor scale respectively. Placed across the top row of sheet 400, said holes correspond to the following square sections and notes as shown in Table 8 below.

Similar templates could be constructed for the blues scale and other scales.

TABLE 8

| HOLE | SECTION | NOTE |
|---|---|---|
| 491 | 450 | A |
| 492 | 452 | B |
| 493 | 453 | C |
| 494 | 455 | D |
| 495 | 457 | E |
| 496 | 458 | F |
| 497 | 460 | G |
| 498 | 461 | A |

Figure 10:
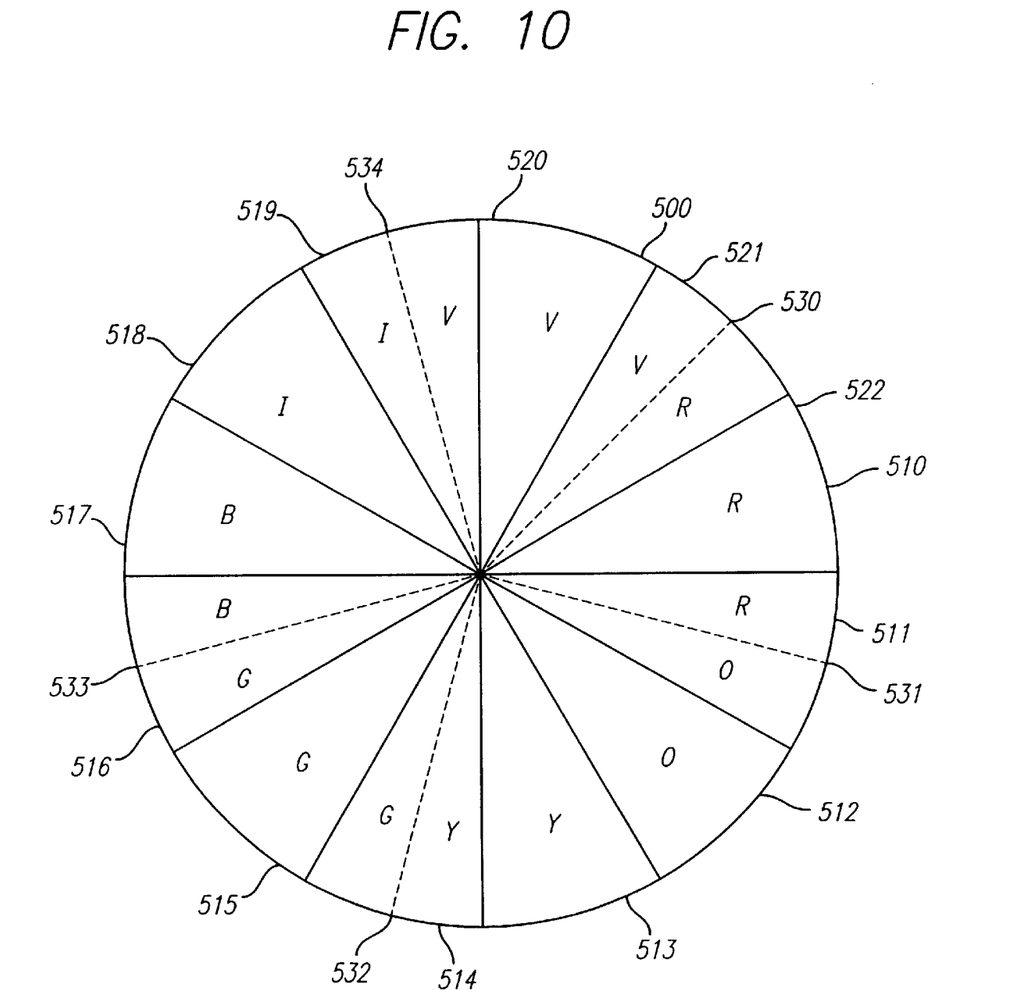
FIG. 10 shows a circular, rigid sheet with a center.

FIG. 10 shows a circular, rigid sheet 500 with a center 501. Said circular sheet comprises 12 equal pie-shaped sections 510–521. Each section represents a note and is colored appropriately. Imaginary dashed lines 530–534 divide sections 521, 511, 514, 516 and 519, respectfully, showing that said sections comprise two colors. Table 9 below identifies each section, the color or colors of each section and the colors comprising each section.

TABLE 9

| NUMBER | COLOR(S) | NOTE |
|---|---|---|
| 510 | RED | A |
| 511 | RED and ORANGE | A♯/B♭ |
| 512 | ORANGE | B |
| 513 | YELLOW | C |
| 514 | YELLOW and GREEN | C♯/D♭ |
| 515 | GREEN | D |
| 516 | GREEN and BLUE | D♯/E♭ |
| 517 | BLUE | E |
| 518 | INDIGO | F |
| 519 | INDIGO and VIOLET | F♯/G♭ |
| 520 | VIOLET | G |
| 521 | VIOLET and RED | G♯/A |
| 522 | RED | A |

A circular template can be placed over the top of the circular rigid sheet 500 and affixed to the center by a rivet or other means. The template would have holes formed therein to correspond to major, minor, blues and/or other scales and could be rotated appropriately around the center securing means.

Instruction can be further facilitated by also supplying a student a booklet with musical compositions wherein the notes of the musical compositions are colored in conformity with the instrument color scheme of the present invention. Accordingly, without reference to FIG. 2, the C notes 52, 54, 56, 58, 60, 62, 64, 66 could each be colored yellow where included in the musical compositions. Likewise, the B notes 53, 55, 57, 59, 61, 63, 65 could be colored orange where included in the musical compositions. Other diatonic notes would comprise their respective colors. With respect to chromatic notes, it is suggested that the "note" symbol of the musical notation comprise the color of the diatonic note shown and the sharp symbol (#) or flat symbol (♭) remain black.

Applicant is aware of two prior art devices which have colored keys. Both of these prior art devices differ from the present invention in several significant respects. The first item is the "Fisher-Price Grand Piano." This is a toy piano comprising eight keys, C, D, E, F, G, A, B and C. Each key comprises a different color. One C key is colored lavender while the other C key is colored red. Therefore, the colors are utilized inconsistently, contrary to the teachings of this application. According to the present invention, it would be expected that both C keys would be the same color.

Further, the toy piano does not comprise chromatic keys. This is an important distinction. A toy generally will not have chromatic keys, but a serious musical instrument generally will have means to play chromatic notes.

The second prior art device is a "My Song Maker Electronic Singalong Guitar." This device is a toy "guitar" (it is in the shape of a guitar) comprising 13 round buttons for playing notes G, A, B, C, D, E, F, G, A, B, C, D, E. There are no strings. The buttons are the colors set forth in Table 10 below.

TABLE 10

| NOTE | COLOR |
|------|-------|
| G | RED |
| A | BLUE |
| B | YELLOW |
| C | GREEN |
| D | PURPLE |
| E | RED |
| F | BLUE |
| G | YELLOW |
| A | GREEN |
| B | PURPLE |
| C | RED |
| D | BLUE |
| E | YELLOW |

Therefore, as with the first prior art device, the colors are used inconsistently (e.g., one C button is green and the other is red) and there are no means for playing chromatic tones.

Although the present invention has been described in detail with regarding the exemplary embodiments and drawings thereof, it should be apparent to those skilled in the art that various adaptations and modifications of the present invention may be accomplished without departing from the spirit and the scope of the invention. Accordingly, the invention is not limited to the precise embodiment shown in the drawings and described in detail herein above. Therefore, it is intended that all such variations not departing from the spirit of the invention be considered as within the scope thereof as limited solely by the claims appended hereto.

What is claimed is:

1. A fingerboard for a stringed instrument comprising:

An elongated neck having a surface, said surface comprising a plurality of diatonic portions, each said diatonic portion having a corresponding diatonic note;

wherein each said corresponding note has an associated note color; and wherein each said diatonic portion comprises the note color associated with its corresponding note;

wherein said plurality of diatonic portions comprise (a) at least one diatonic portion with its corresponding diatonic note being A, (b) at least one diatonic portion with its corresponding diatonic note being B, (c) at least one diatonic portion with its corresponding diatonic note being C, (d) at least one diatonic portion with its corresponding diatonic note being D, (e) at least one diatonic portion with its corresponding diatonic note being E, (f) at least one diatonic portion with its corresponding diatonic note being F, and (g) at least one diatonic portion with its corresponding diatonic note being G; and wherein said surface further comprises a plurality of chromatic portions, each said chromatic portion having a corresponding chromatic note;

wherein each said chromatic portion (a) comprises the note color associated with the diatonic note one half step higher than the chromatic note corresponding to said chromatic portion and further (b) comprises the note color associated with the diatonic note one half step lower than the chromatic note corresponding to said chromatic portion.

2. The fingerboard for a stringed instrument of claim 1, wherein the fingerboard further comprises frets.

3. A keyboard for a keyboard musical instrument comprising:

a keyboard comprising a plurality of diatonic keys, each said diatonic key having a corresponding diatonic note and a playing surface, wherein a. each said corresponding note has an associated note color, b. each playing surface of said diatonic key comprises the color associated with its corresponding note, and c. said plurality of diatonic keys comprise (i) at least one diatonic key with its corresponding diatonic note being A, (ii) at least one diatonic key with its corresponding diatonic note being B, (iii) at least one diatonic key with its corresponding diatonic note being C, (iv) at least one diatonic key with its corresponding diatonic note being D, (v) at least one diatonic key with its corresponding diatonic note being E, (vi) at least one diatonic key with its corresponding diatonic note being F, and (vii) at least one diatonic key with its corresponding diatonic note being G; and a plurality of chromatic keys, each said chromatic key having a corresponding chromatic note, wherein each said chromatic key has a playing surface and said playing surface (a) comprises the note color associated with the diatonic note one half step higher than the chromatic note corresponding to said chromatic key and further (b) comprises the note color associated with the diatonic note one half step lower than the chromatic note corresponding to said chromatic key.

4. The keyboard of claim 3 wherein the playing surface of each chromatic key has a left half and a right half and the left half comprises the note color associated with the diatonic note one half step higher than the chromatic note corresponding to said chromatic key and the right half comprises the note color associated with the diatonic note one half step lower than the chromatic note corresponding to said chromatic key.

5. The keyboard of claim 3 wherein each key in said plurality of diatonic keys and in said plurality of chromatic keys is a conventional piano key.

6. A musical instrument comprising:

a plurality of diatonic note playing means, each said diatonic note playing means having a diatonic note playing surface and playing a corresponding diatonic note; and a plurality of diatonic sheets, each said sheet comprising a note color associated with a particular diatonic note, wherein each said diatonic note playing surface has at least one diatonic sheet secured to it such that the note color comprising the sheet corresponds to the diatonic note played by the diatonic note playing means;

wherein said plurality of diatonic note playing means comprises (i) at least one diatonic note playing means with its corresponding diatonic note being A, (ii) at least one diatonic note playing means with its corresponding diatonic note being B, (iii) at least two diatonic note playing means with their corresponding diatonic note being C, (iv) at least one diatonic note playing means with its corresponding diatonic note being D, (v) at least one diatonic note playing means with its corresponding diatonic note being E, (vi) at least one diatonic note playing means with its corresponding diatonic note being F, and (vii) at least one diatonic note playing means with its corresponding diatonic note being G;

wherein said musical instrument further comprises a plurality of chromatic note playing means, each said chromatic note playing means having a playing surface and playing a corresponding chromatic note; and a plurality of chromatic sheets, each said sheet comprising two colors, the combination of said colors being associated with a particular chromatic note, wherein each said chromatic note playing surface has at least one chromatic sheet secured to it such that the colors comprising the sheet are the same as those which are associated with the chromatic note corresponding to the chromatic note playing surface; and wherein each said combination of colors associated with a particular chromatic note comprises the note color associated with the diatonic note one half step higher than the chromatic note and the note color associated with the diatonic note one half step lower than the chromatic note.

7. The musical instrument of claim 6 wherein each said sheet is a sticker.

8. The musical instrument of claim 6 wherein each said sheet is circular.

9. The musical instrument of claim 6 wherein said musical instrument comprises a fret board and each said sheet is rectangular.

* * * * *